US010337526B2

(12) United States Patent
Shao et al.

(10) Patent No.: US 10,337,526 B2
(45) Date of Patent: Jul. 2, 2019

(54) BLOWER

(71) Applicant: CHERVON (HK) LIMITED, Wanchai (HK)

(72) Inventors: Xiandian Shao, Nanjing (CN); Toshinari Yamaoka, Nanjing (CN); Fangjie Nie, Nanjing (CN); Jianpeng Guo, Nanjing (CN)

(73) Assignee: CHERVON (HK) LIMITED, Wanchai (HK)

( * ) Notice: Subject to any disclaimer, the term of this patent is extended or adjusted under 35 U.S.C. 154(b) by 332 days.

(21) Appl. No.: 15/147,501

(22) Filed: May 5, 2016

(65) Prior Publication Data
US 2016/0330913 A1 Nov. 17, 2016

(30) Foreign Application Priority Data

May 11, 2015 (CN) .......................... 2015 1 0235719
May 11, 2015 (CN) .......................... 2015 1 0235758
(Continued)

(51) Int. Cl.
E01H 1/08 (2006.01)
F04D 29/54 (2006.01)
(Continued)

(52) U.S. Cl.
CPC ........... F04D 29/545 (2013.01); A01G 20/47 (2018.02); F04D 19/002 (2013.01);
(Continued)

(58) Field of Classification Search
CPC ........ A01G 1/125; A01G 20/43; A01G 20/47; F04D 19/002; F04D 25/0673; F04D 25/084; F04D 29/545; F04D 29/703
See application file for complete search history.

(56) References Cited

U.S. PATENT DOCUMENTS

2011/0000048 A1* 1/2011 Yamazaki ............... F02B 61/04
15/405
2014/0234130 A1* 8/2014 Yamaoka .................. A47L 5/24
417/234
(Continued)

FOREIGN PATENT DOCUMENTS

AU  2014100150 A4  3/2014
CN  103016586 A    4/2013
(Continued)

OTHER PUBLICATIONS

Canadian Patent Office, Office Action issued on Canadian patent application No. 2,929,511, dated Dec. 15, 2017, 4 pages.
(Continued)

Primary Examiner — Marc Carlson
(74) Attorney, Agent, or Firm — Greenberg Traurig, LLP

(57) ABSTRACT

A blower includes a fan for generating an air flow, a motor for driving the fan to rotate about a central axis, a battery pack for supplying power to the motor, an air duct portion including an air duct, the air duct extending long the central axis, a coupling portion for coupling with the battery pack, and a connection portion for connecting the air duct portion with the coupling portion. The fan is received in the air duct. The air duct includes an air duct inlet and an air duct outlet which are respectively located at the two ends of the air duct. The air duct inlet is located between the air duct outlet and the coupling portion. The connection portion is provided with an air intake space located between the air duct inlet and the coupling portion. The air intake space is opened in a radial direction of the central axis.

28 Claims, 11 Drawing Sheets

(30) Foreign Application Priority Data

May 11, 2015 (CN) .......................... 2015 1 0235809
May 11, 2015 (CN) .......................... 2015 1 0237994
May 11, 2015 (CN) .......................... 2015 1 0238214

(51) Int. Cl.
*F04D 25/06* (2006.01)
*F04D 25/08* (2006.01)
*F04D 19/00* (2006.01)
*F04D 29/70* (2006.01)
*A01G 20/47* (2018.01)

(52) U.S. Cl.
CPC ....... *F04D 25/0673* (2013.01); *F04D 25/084* (2013.01); *F04D 29/703* (2013.01)

(56) References Cited

U.S. PATENT DOCUMENTS

| | | | | |
|---|---|---|---|---|
| 2015/0327352 A1* | 11/2015 | Kikuchi | ................ | E01H 1/0809 |
| | | | | 417/364 |
| 2016/0169249 A1* | 6/2016 | Takahashi | ............. | F04D 29/667 |
| | | | | 417/411 |
| 2017/0021489 A1* | 1/2017 | Bylund | ..................... | A47L 5/14 |
| 2017/0325410 A1* | 11/2017 | Gao | ....................... | A01G 1/125 |

FOREIGN PATENT DOCUMENTS

CN 103382708 A 11/2013
CN 104074155 A 10/2014

OTHER PUBLICATIONS

Canadian Patent Office, Office Action issued on Canadian patent application No. 2,929,511, dated Apr. 3, 2017, 4 pages.

\* cited by examiner

BLOWER

RELATED APPLICATION INFORMATION

This application claims the benefit under 35 U.S.C. § 119(a) of Chinese Patent Application No. CN 201510238214.7, filed on May 11, 2015, Chinese Patent Application No. CN 201510237994.3, filed on May 11, 2015, Chinese Patent Application No. CN 201510235809.7, filed on May 11, 2015, Chinese Patent Application No. CN 201510235758.8, filed on May 11, 2015, and Chinese Patent Application No. CN 201510235719.8, filed on May 11, 2015, all of which are incorporated herein by reference in their entirety.

FIELD OF THE DISCLOSURE

The present disclosure relates generally to power tools and, more particularly, to a blower.

BACKGROUND OF THE DISCLOSURE

Blowers are commonly used gardening tools, which are used to clean the fallen leaves in the garden through an air flow. Currently known blowers include centrifugal type blowers and axial type blowers. The axial type blowers can generate greater air quantity to better satisfy the requirements of the users.

The blower generates the air flow through an air duct and a fan disposed within the air duct. In order to realize better blowing effect, it would be better that the air duct is designed to have a linear structure.

In order to improve the power and lengthen usage time, currently known blowers generally use a bigger battery pack. In order to assemble the battery pack and a gripping portion, the blower may have an air duct with a curved shape. However, a curved portion of the air duct makes air which flows through the curved portion slow down.

If a blower has an axial type fan to generate air flow and a curved air duct to direct the air flow, the speed of the air flow which the blower outputs may suffer a loss.

The statements in this section merely provide background information related to the present disclosure and may not constitute prior art.

SUMMARY

In one aspect of the disclosure, a blower includes a fan for generating an air flow, a motor for driving the fan to rotate about a central axis, a battery pack for supplying power to the motor, an air duct portion including an air duct, the air duct extending along the central axis, a coupling portion for coupling with the battery pack, and a connection portion for connecting the air duct portion with the coupling portion. The fan is received in the air duct. The air duct includes an air duct inlet and an air duct outlet which are respectively located at the two ends of the air duct. The air duct inlet is located between the air duct outlet and the coupling portion. The connection portion is provided with an air intake space located between the air duct inlet and the coupling portion. The air intake space is opened in a radial direction of the central axis.

In another aspect of the disclosure, a blower includes a fan for generating an air flow, a motor for driving the fan to rotate about a central axis, an air duct portion including an air duct, the air duct extending long the central axis, a coupling portion for coupling with a battery pack, the battery pack being capable of supplying power to the motor, a connection portion connected with the air duct portion and the coupling portion, and a gripping portion for a user to grip. The fan is received in the air duct. The air duct includes an air duct inlet and an air duct outlet which are respectively located at the two ends of the air duct. The air duct inlet is located between the air duct outlet and the coupling portion. The gripping portion includes a middle plane which is substantially parallel to the central axis. The connection portion is provided with an air intake space which is opened in a direction substantially perpendicular to the middle plane. The air intake space is disposed between the air duct portion and the coupling portion.

In yet another aspect of the disclosure, a blower includes a fan for generating an air flow, a prime mover for driving the fan to rotate about a central axis, a power source for supplying power to the motor, an air duct portion forming an air duct, the air duct extending long the central axis, and a connection portion for connecting the air duct portion with the power source. The fan is received in the air duct. The air duct includes an air duct inlet and an air duct outlet which are respectively located at the two ends of the air duct. The air duct inlet is located between the air duct outlet and the power source. The connection portion is provided with an air intake space located between the air duct inlet and the power source. The air intake space is opened in a radial direction of the central axis.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected examples and not all possible implementations, and are not intended to limit the scope of the present disclosure. Corresponding reference numerals indicate corresponding parts throughout the several views of the drawings.

DETAILED DESCRIPTION

Figure 1:
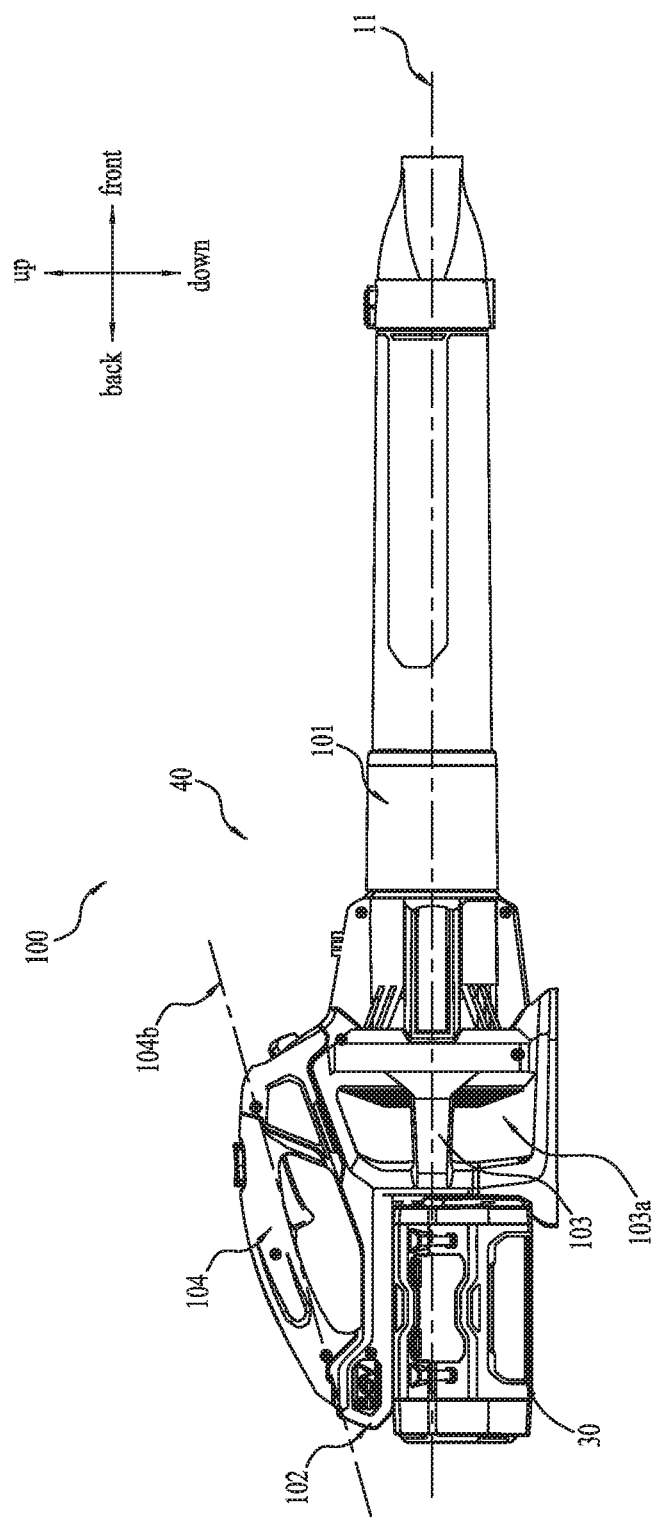
FIG. 1 is a schematic view of an exemplary blower.

The following description of preferred embodiments is merely exemplary in nature and is in no way intended to limit the scope of the invention hereinafter claimed, its application, or uses.

Referring to FIGS. 1-4, a blower 100 includes a fan 10, a motor 20, a battery pack 30 and a housing 40.

The fan 10 includes a plurality of fan blades, so that an air flow can be generated when the fan 10 is rotated.

The motor 20 is used to drive the fan 10, and the fan 20 is capable of rotating about a central axis 11.

The battery pack 30 is used to supply power to the motor 20, and the motor 20 is capable of transforming electricity energy to mechanical energy so as to drive the fan 10.

The blower 100 includes three portions: an air duct portion 101, a coupling portion 102 and a connection portion 103.

Figure 2:
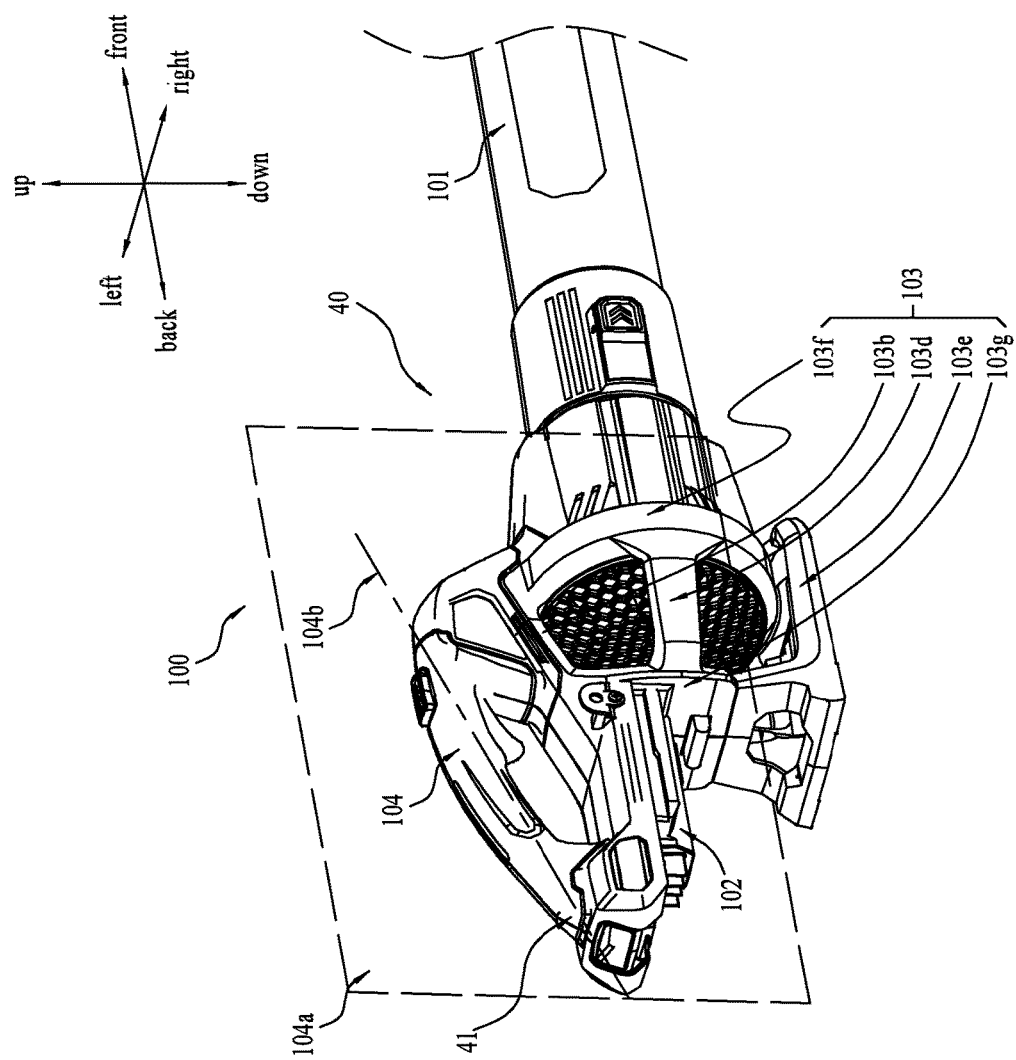
FIG. 2 is a schematic view of a portion of the blower in FIG. 1.

For convenience of the reader only, the coordinates in FIGS. 1-2 define front, back, left, right, up and down directions. The front, back, left, right, up and down direction herein described will refer to these coordinates. These directional definitions are provided for convenience only and are not to be considered as being absolute locations. The front, back, left, right, up and down directions are relative to the blower 100, which are not equal to the front, back, left, right, up and down directions of a user and not relative to the posture of the user.

Referring to FIGS. 1-4, the air duct portion 101 is disposed in the front of the connection portion 103, and the coupling portion 102 is disposed in the back of the connection portion 103. The central axis 11 can be parallel to a back and front direction.

The air duct portion 101, the coupling portion 102 and the connection portion 103 are arranged along a direction substantially parallel to the central axis 11.

The air duct portion 101 includes an air duct 101a extended along the central axis 11. The coupling portion 102 includes a structure for coupling with the battery pack 30. The connection portion 103 is used to connect the air duct portion 101 with the coupling portion 102.

The air duct 101a includes an air duct inlet 101b and an air duct outlet 101c which are respectively disposed on the two opposite ends of the air duct 101a.

The fan 10 is received in the air duct 101a and disposed between the air duct inlet 101b and the air duct outlet 101c. The air duct inlet 101b is disposed between the air duct outlet 101c and the coupling portion 102.

The connection portion 103 is provided with an air intake space 103a between the air duct portion 101 and the coupling portion 102 in a direction of the central axis 11. The air intake space 103a is adjacent to the air duct inlet 101b.

The connection portion 103 is at least extended in the direction of the central axis 11 to make the air duct portion 101 and the coupling portion 102 depart from each other so as to form the air intake space 103a therebetween. In an axial direction of the central axis, the air intake space 103a formed by the connection portion 103 is opened in a plurality of radial directions.

It is noted that, a radial direction here is a direction of a radius of a circle which is centered by the central axis 11 and which lies in a plane 12 that is substantially perpendicular to the central axis 11. For the circle, each angle of the circle corresponds to a radial, that is to say each angle represents a radial direction. The air intake space 103a being opened in a plurality of radial directions means the air intake space 103a is opened at least in a plurality of angles.

In order to ensure the air quantity, a sum of the plurality of angles that the air intake space 103a is opened should be greater than or equal to 30 degrees.

The sum of the plurality of angles that the air intake space 103a is opened can be selected among the following ranges: 30-45 degrees, 45-60 degrees, 60-75 degrees, 75-90 degrees, 90-105 degrees, 105-120 degrees, 120-135 degrees, 135-150 degrees, 150-165 degrees, 165-180 degrees, 180-195 degrees, 195-210 degrees, 210-225 degrees, 225-240 degrees, 240-255 degrees, 255-270 degrees, 270-285 degrees, 285-300 degrees, 300-315 degrees, 315-330 degrees, 330-345 degrees, 345-360 degrees, or 30-120 degrees, 120-210 degrees, 210-300 degrees, and 300-360 degrees.

The air intake space 103a is opened at least in the radial directions of a continuous angle range. The minimum value of the continuous angle range is greater than or equal to 5 degrees and less than or equal to 355 degrees.

Referring to FIGS. 1-4, the housing 40 includes a gripping portion 104 for the user to grip. The gripping portion 104 includes a middle plane 104a and is approximately symmetrical relative to the middle plane 104a. The air intake space 103a is opened in a direction substantially perpendicular to the middle plane 104a.

The middle plane 104a is substantially perpendicular to a left-right direction. That is to say, when the air duct portion 101 is arranged in the front of the connection portion 103, the coupling portion 102 is arranged in the back of the connection portion 103, and the central axis 11 is substantially parallel to the back and front direction, the air intake space 103a is opened in the left-right direction. In order to increase the air quantity, the air intake space 103a can be opened on its top and bottom and in the back. The air duct inlet 101b is arranged in front of the air intake space 103a.

For the central axis 11, the air intake space 103a can be opened on the upper left, upper right, bottom left and bottom right of the central axis 11, and some locations on the bottom.

As shown in FIG. 1, when the battery pack 30 is coupled to the coupling portion 102 of the housing 40, the gripping portion 104 and the battery pack 30 are respectively located on the upside and downside of the central axis 11. The air intake space 103a is opened on the upside and downside of the central axis 11.

The gripping portion 104 is extended along a line direction which is intersected obliquely with the central axis 11. The gripping portion 104 has a length direction in which a substantial portion of the gripping portion 104 is located.

The air intake space 103a can be opened in a direction substantially perpendicular to a plane which is formed by the intersection of a line 104b that the length direction of the gripping portion 104 is located and the central axis 11.

Referring to FIGS. 1-2, the gripping portion 104 is symmetrical relative to the middle plane 104a, the line 104b is located within the middle plane 104a, and the central axis 11 can be arranged within the middle plane 104a. With this arrangement, the plane which is formed by the line 104b that the length direction of the gripping portion 104b defines and the central axis 11 is the middle plane 104a. As shown in FIG. 2, the air intake space 103a is opened in the direction substantially perpendicular to the middle plane 104a.

It is noted that, the air intake space 103a being opened in certain direction means the air flow can enter into the air intake space 103a along the certain direction, not that there is necessarily any physical structure in the certain direction. In other words, if there is no continuous physical structure formed by the connection portion 103 to totally cover the certain direction so that the air flow cannot be entered into the air intake space 103a along the certain direction, which needs to go round the physical structure along other directions, it is considered that the air intake space 103a is opened in the certain direction.

Referring to FIGS. 1-4, the connection portion 103 includes a cantilever 103b, a left arm 103c, a right arm 103d, a base 103e, a front support 103f and a rear support 103g. The left and right arms 103c, 103d can be arranged symmetrically.

The front support 103f is generally annular shaped, which surrounds the air duct inlet 101b. The rear support 103g is located between the battery pack 30 and the air intake space 103a.

The cantilever 103b is extended from the rear to the front and toward the oblique upper direction. The left arm 103c is extended from the rear to the front and toward the left side obliquely. The right arm 103d is extended from the rear to the front and toward the right side obliquely. Thus, the cantilever 103b, the left arm 103c and the right arm 103d form a space, and the space is increased gradually from the rear to the front, so that the air intake space 103a is opened enough at the air duct inlet 101b to assure the enough air quantity. The cantilever 103b, the left arm 103c and the right arm 103d is respectively inclined at an angle less than or equal to 60 degrees relative to the central axis 11.

The cantilever 103b is disposed on the top of the air intake space 103a. The left arm 103c and the right arm 103d are respectively disposed on the left and right side of the air intake space 103a. The base 103e is disposed on the bottom of the air intake space 103a. The front and rear supports 103f, 103g are respectively disposed on the front side and rear side of the air intake space 103a.

The air intake space 103a is opened between the cantilever 103b and the base 103e except a part blocked by the left and right arms 103c, 103d, and an object can go through between the cantilever 103b and the base 103e along the left-right direction.

The cantilever 103b, the left arm 103c, the right arm 103d and the base 103e are connected with the front and rear supports 103f, 103g, which are distributed discretely in a circumferential direction of the central axis 11. The space between the cantilever 103b, the left arm 103c, the right arm 103d and the base 103e can be considered as belonging to the air intake space 103a. The front and rear supports 103f, 103g form the cantilever 103b, the left arm 103c, the right arm 103d and the base 103e which are distributed discretely connect as a whole in the front and rear sides, and make them connect with the air duct portion 101 and the coupling portion 102. The front and rear supports 103f, 103g constitute a boundary of the air intake space 103a in the direction of the central axis 11.

The air duct portion 101 and the coupling portion 102 can be connected through one structure along the central axis 11, such as one of the cantilever 103b, the left arm 103c, the right arm 103d and the base 103e. The front and rear supports 103f, 103g can be omitted, and the one structure is directly connected with the air duct portion 101 and the coupling portion 102.

In view of the structural strength and the usage safe, two connection structures can be used to connect the air duct portion 101 and the coupling portion 102. It is needed to arrange a front structure in the front side to connect the front ends of the two connection structures, and a rear structure in the back side to connect the rear ends of the two connection structures.

Figure 3:
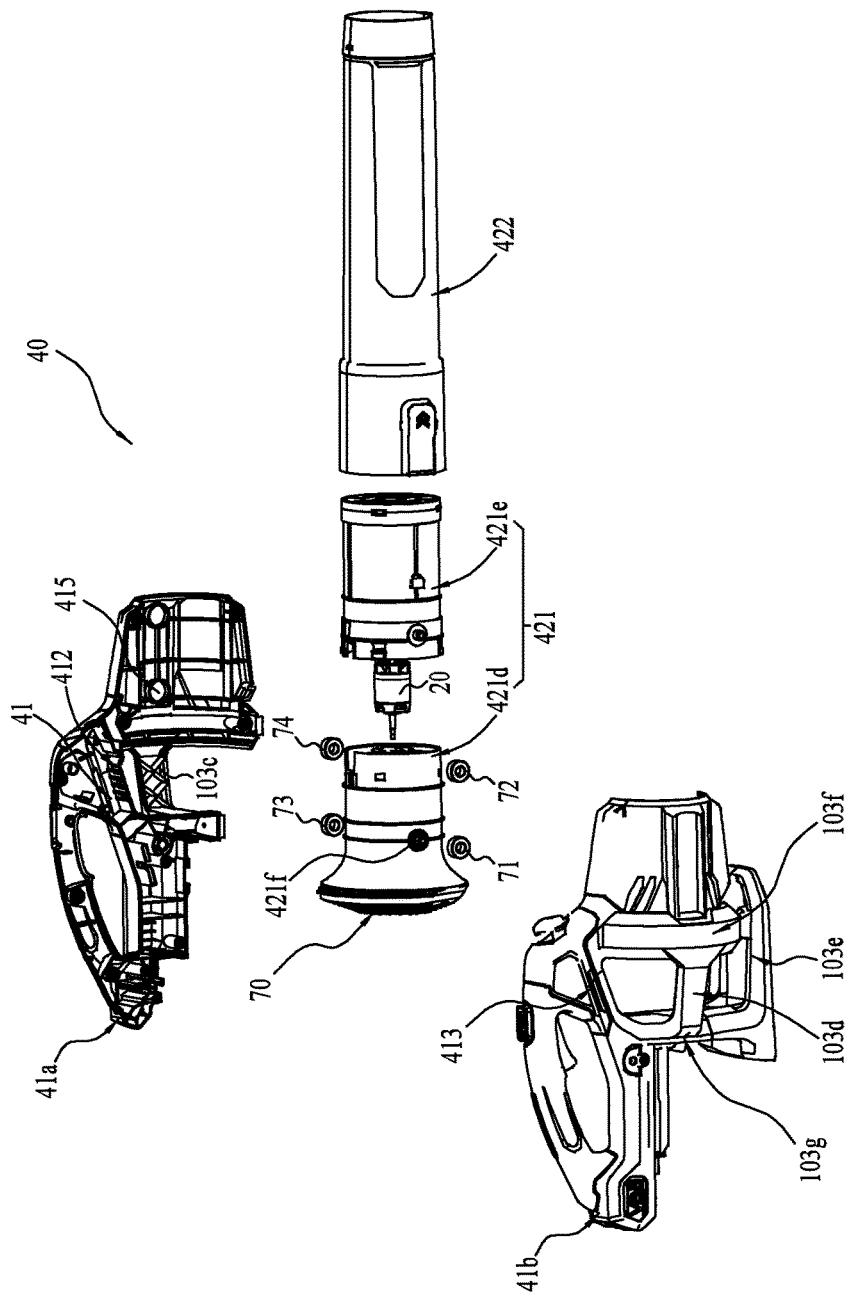
FIG. 3 is an exploded view of the blower in FIG. 1, wherein a battery pack of the blower is removed.

Two or three of the front support 103f, the rear supports 103g, the cantilever 103b, the left arm 103c, the right arm 103d and the base 103e in FIGS. 1-3 can constitute the connection structures.

Figure 9:
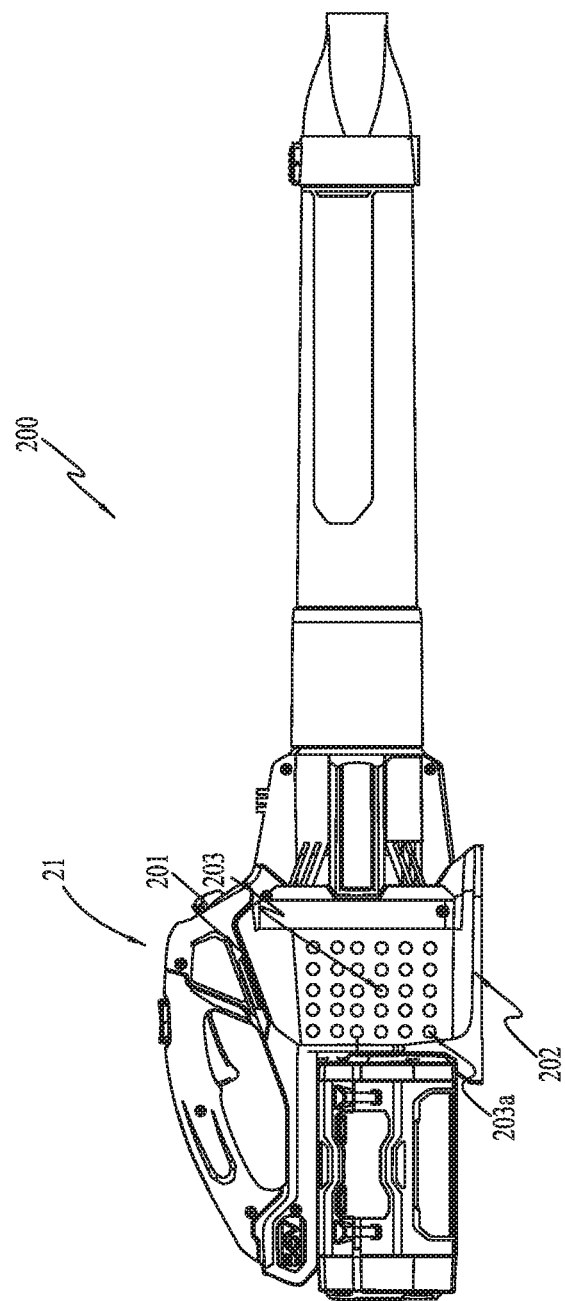
FIG. 9 is another schematic view of an exemplary blower.

In order to avoid foreign matter being absorbed into the air intake space 103a due to the opening of the air intake space 103a, as shown in FIG. 9, a further blower 200 includes a shield 203. The shield 203 is provided with holes 203a. The blower 200 has the same structure as the blower 100 in FIG. 1 except the connection portion. The connection portion of blower 200 only includes a cantilever 201 and a base 202.

The gripping portion 104 includes a first end and a second end. The first end is connected with the cantilever 103b, and the second end is connected with the coupling portion 102. The coupling portion 102 is located under the gripping portion 104 and in the back of the connection portion 103.

Referring to FIGS. 1-4, the housing 40 includes a plurality of components. Specifically, the housing 40 includes a main housing 41 and an air duct housing 42.

The main housing 41 is used to constitute the coupling portion 102, the connection portion 103 and the gripping portion 104. The air duct housing 42 is used to constitute the air duct portion 101.

The connection portion 103 can be constituted totally by the main housing 41. Also, the connection portion 103 can be constituted partially by the main housing 41. For example, the cantilever 103b, the left arm 103c, the right arm 103d, the front support 103f and the rear support 103g can be constituted by the main housing 41, and the base 103e can be constituted by a single component. Otherwise, the cantilever 103b may have a hollow structure for containing some elements.

Figure 5:
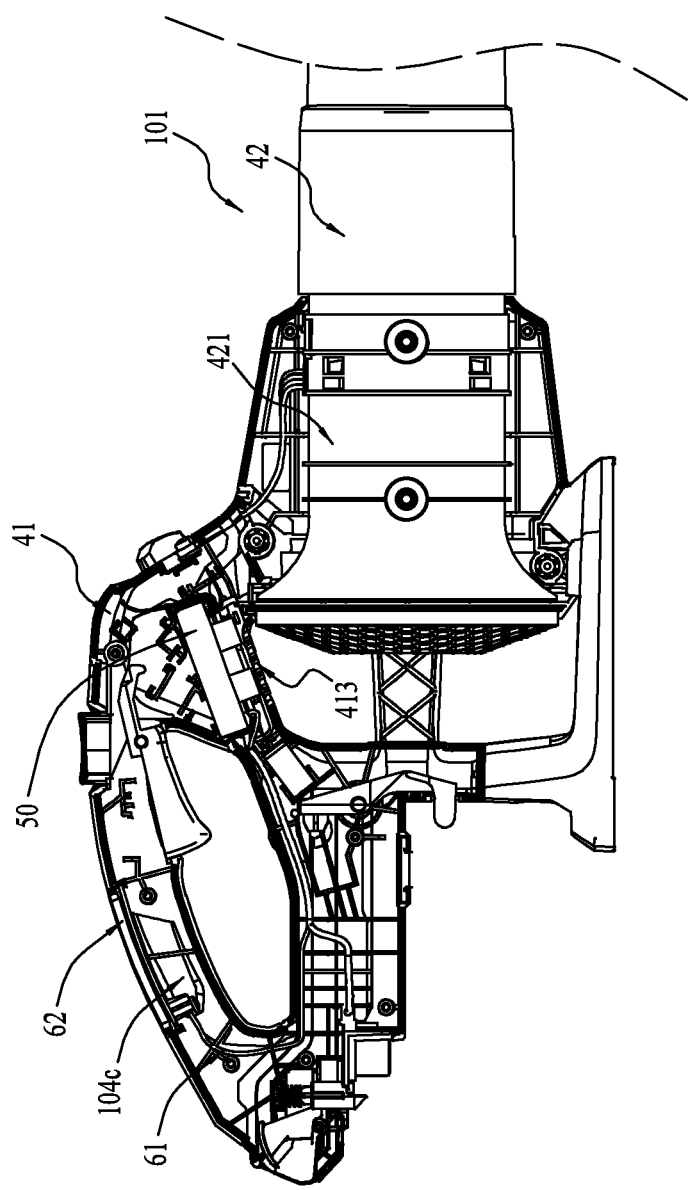
FIG. 5 is a schematic view showing an inner structure of a main housing of the blower in FIG. 1.
Figure 7:
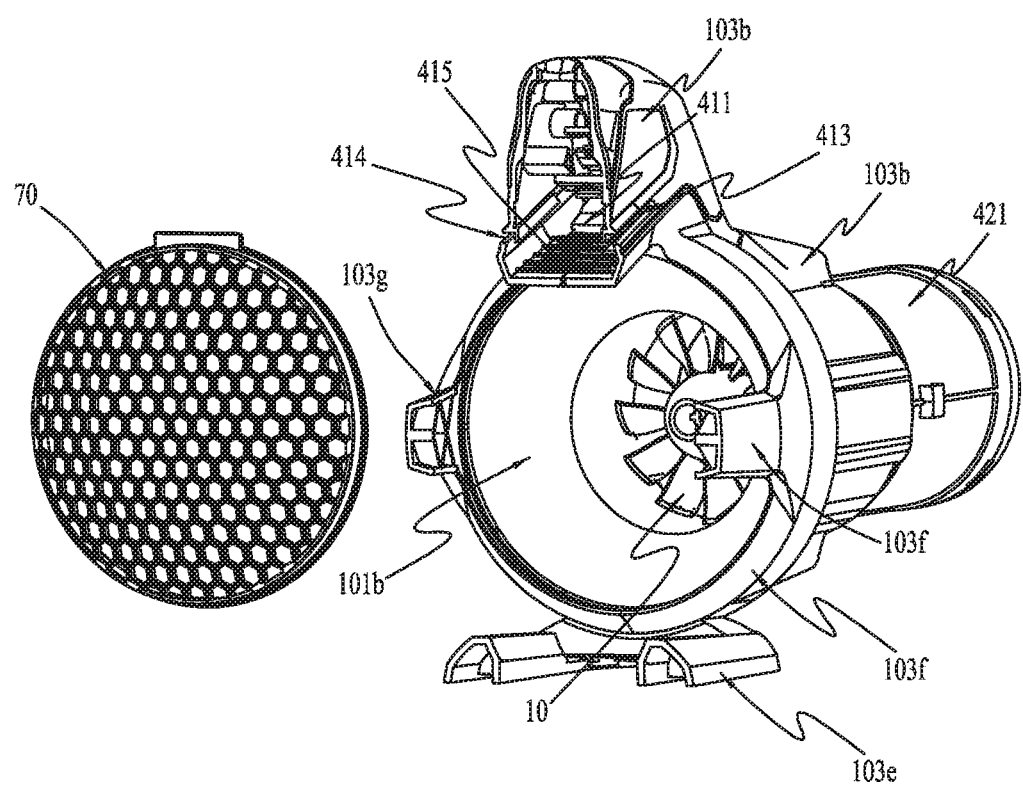
FIG. 7 is a schematic view of the blower in FIG. 1, wherein the blower is truncated by a section and a cover of the blower is removed.

Referring to FIGS. 3, 5 and 7, the cantilever 103b formed by the main housing 41 includes a containing chamber 411 for containing electrical elements and circuits. The blower 100 includes a circuit board 50 for controlling the motor 20. The circuit board 50 is received in the containing chamber 411.

The circuit board 50 or the electrical elements mounted on the circuit board 50 typically generate heat during the control of the motor 20.

As shown in FIG. 5, the circuit board 50 can be disposed at a position within the containing chamber 411 which corresponds to the air intake space 103a. The main housing 41 is provided with a cooling air outlet 412 at the position.

The cooling air outlet 412 can be arranged to correspond to the air intake space 103a in the direction substantially parallel to the central axis 11.

The cooling air outlet 412 allows the containing chamber 411 to communicate with the air intake space 103a. When the fan 10 is driven to rotate by the motor 20, the air in the containing chamber 411 flows from the cooling air outlet 412 and into the air intake space 103a, and then is absorbed into the air duct inlet 101b. The flowing air passes through the circuit board 50 so as to cool the circuit board 50.

Referring to FIGS. 3 and 7, the main housing 41 is provided with a cooling air inlet 413 allowing the air outside the containing chamber 411 to flow into the containing chamber 411. The cooling air inlet 413 is disposed at the cantilever 103b. The circuit board 50 or a part of the circuit board 50 can be disposed between the cooling air inlet 413 and the cooling air outlet 412. The air enters in the containing chamber 411 from the cooling air inlet 413, passes through the circuit board 50 and exits from the cooling air outlet 412 so as to cool the circuit board 50.

As shown in FIG. 7, for better cooling effect, the main housing 41 is further provided with a cooling air inlet 414 that also allowing the air outside the containing chamber 411 to flow into the containing chamber 411

The cooling air inlets 413, 414 can be disposed above the cooling air outlet 412 and respectively on the left and right side of the cantilever 103b.

The cooling air outlet 412 may be provided via use of holes, and the cooling air inlets 413, 414 may be labyrinth for keep foreign matter from entering into the containing chamber 411.

The gripping portion 104 formed by the main housing 41 is provided with a chamber for containing a trigger switch and wires. Due to the negative pressure generated at the cooling air outlet 412, the air in the gripping portion 104 can flow out of the main housing 41 from the cooling air outlet 412.

As shown in FIG. 3, the main housing 41 includes two symmetrical main housing halves 41a, 41b which can constitute a whole.

Figure 4:
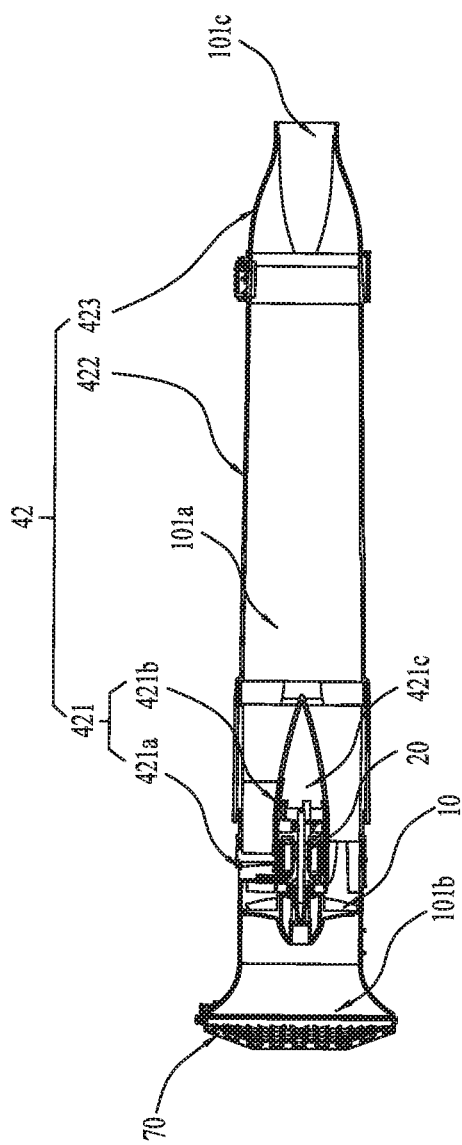
FIG. 4 is a schematic view showing an inner structure of an air duct of the blower in FIG. 1.

Referring to FIGS. 3-4, the air duct housing 42 includes an inner air duct 421 and an outer air duct 422. The inner air duct 421 is partially contained in the outer air duct 422. The inner air duct 421 and outer air duct 422 cooperatively form the air duct 101a or a section of the air duct 101a.

The outer air duct 422 can be connected detachably with the inner air duct 421. So the user can change the outer air duct 422.

Referring to FIGS. 1-4, the air duct housing 42 includes a guiding connector 423. The guiding connector 423 is mounted detachably to a front end of the outer air duct 422 so as to guide the air in the air duct 101a to flow out of the air duct 101a.

As shown in FIG. 4, for the blower 100 with the guiding connector 423, the air duct 101a is constituted by the inner air duct 421, the outer air duct 422 and the guiding connector 423. A rear end of the inner air duct 421 acts as the air duct inlet 101b of the air duct 101a, and a front end of the guiding connector 423 acts as the air duct outlet 101c of the air duct 101a.

As shown in FIG. 3, when the guiding connector 423 is removed, the air duct 101a is constituted by the inner air duct 421 and the outer air duct 422. The rear end of the inner air duct 421 acts as the air duct inlet 101b of the air duct 101a, and a front end of the outer air duct 422 acts as the air duct outlet 101c of the air duct 101a.

Referring to FIGS. 4 and 7, the rear end of the inner air duct 421 has a bellmouth shape which opens gradually from the front to the back so as to allow more air to enter into the air duct inlet 101b. In order to keep foreign matter from entering into the air duct inlet 101b formed by the inner air duct 421, a cover 70 is arranged at the air duct inlet 101b. The cover 70 covers the air duct inlet 101b, which is provided by a plurality of holes. In order to increase the area of the holes of the cover 70, the cover 70 has a spherical surface.

As shown in FIG. 4, the inner air duct 421 includes a duct body 421a and a cabin body 421b. The duct body 421a constitutes a part of the air duct 101a. The cabin body 421b is received in the duct body 421a and includes a chamber 421c for containing the motor 20. The fan 10 is received in the duct body 421a and located in the back of the cabin body 421b. A front end of the cabin body 421b has a streamlined shape and is contracted gradually to form a tip.

As shown in FIG. 3, in order to facilitate the mounting of the motor 20, the inner air duct 421 includes a first portion 421d and a second portion 421e which are connected detachably. The first and second portions 421d, 421e can be connected and detached along the direction of the central axis 11. A part of the cabin body 421b is constituted by the first portion 421d, and other part of the cabin body 421b is constituted by the second portion 421e. When the first and second portions 421d, 421e are separated from each other, the motor 20 can be mounted. After the mounting of the motor 20, the first and second portions 421d, 421e are connected together so that the motor 20 is encapsulated within the cabin body 421b.

During the operation of the blower 100, the air duct portion 101 may accumulate static electricity. As shown in FIG. 5, the blower 100 includes a conducting element 61 and a contacting element 62. The conducting element 61 is made of a conducting material. For example, the conducting element 61 may be a wire. The conducting element 61 is connected within the air duct portion 101 for transferring charge. When the contacting element 62 contacts with a human body, it is capable of transferring static electricity to the human body. The contacting element 62 can be made of a material with a resistance less than or equal to $10^{10}$ Ω·m. The contacting element 62 should not be totally made of the conducting material, but a mixed material of the conducting material and an insulating material. So the contacting element 62 can both transfer static electricity but assure the user does not get an electric shock.

The contacting element 62 can be constituted to have a rubber material texture. The contacting element 62 can be exposed to the gripping portion 104, so that the user can contact it when he grips the gripping portion 104. With this arrangement, the static electricity conducted by the conducting element 61 from the air duct portion 101 is transferred to the ground through the contacting element 62 and the hand of the user. Thus, the static electricity at the air duct portion 101 is eliminated.

The conducting element 61 can make the contacting element 62 connect with the inner air duct 421 or connect with the motor 20.

The contacting element 62 can be connected electrically and directly with the inner air duct 421 or the motor 20 through the conducting element 61. That is to say, the conducting element 61 is directly connected with the contacting element 62 and the inner air duct 421 or the motor 20. In other embodiment, the contacting element 62 can be connected electrically and indirectly with the inner air duct 421 or the motor 20 through the conducting element 61. That is to say, the conducting element 61 is connected indirectly with the contacting element 62 and the inner air duct 421 or the motor 20.

Figure 6:
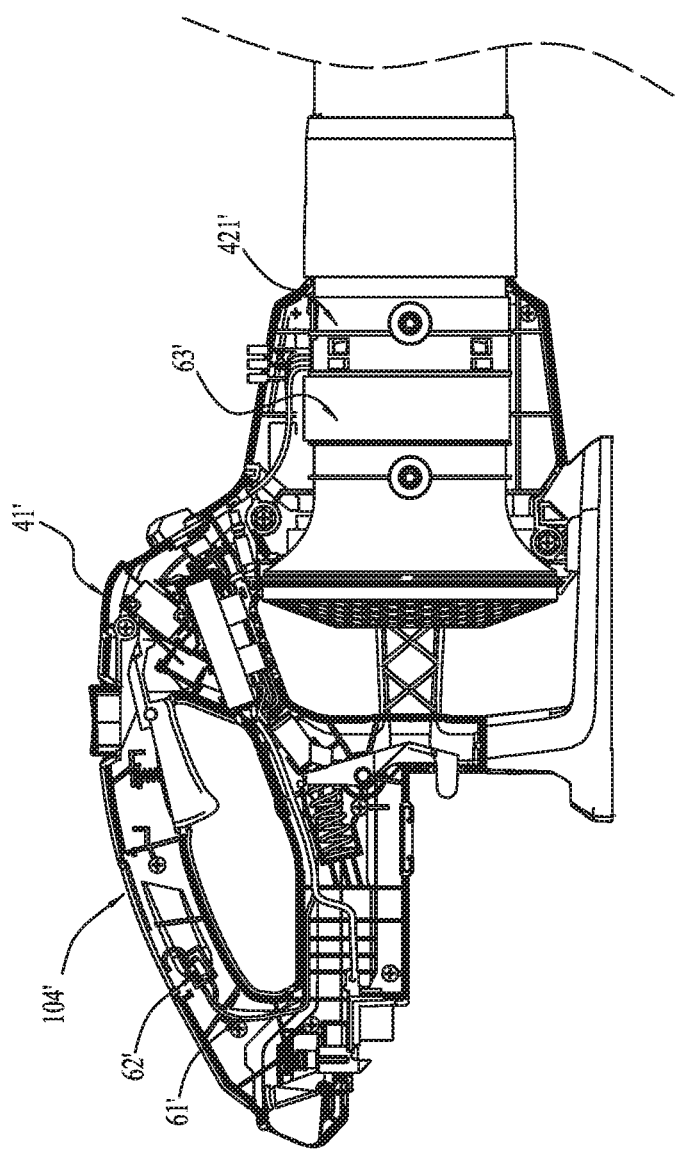
FIG. 6 is a schematic view of the blower with a consuming element.

For example, the conducting element 61 is a first wire. An end of the wire is connected directly with the contacting element 62, and another end of the wire is connected with the circuit board 50. The circuit board 50 is connected with the inner air duct 421 or the motor 20 through a second wire. The circuit board 50 can make the first and second wires connect electrically. It should be also considered that the contacting element 62 and the inner air duct 421 or the motor 20 are connected by the conducting element 61. As shown in FIG. 6, another embodiment of eliminating static electricity is shown. In this embodiment, a conducting element 61' and a consuming device 62' are used to eliminate static electricity.

The conducting element 61' is similar to the conducting element 61. The difference is that the consuming device 62' disposed within a gripping portion 104' is capable of transforming electrical energy to optical energy or thermal energy. The consuming device 62' may include a resistance or a neon tube, which can eliminate static electricity by consuming electrical energy. Alternatively, the consuming device 62' may include both the resistance and the neon tube.

The conducting element 61' can make the consuming device 62' connect directly or indirectly with an inner air duct 421' or a motor within the inner air duct 421'. Alternatively, a conducting ring 63' can be arranged to surround the inner air duct 421' and contact with the inner air duct 421'. The conducting ring 63' is capable of collecting static electricity effectively. The conducting element 61' make the consuming device 62' connect with the conducting ring 63' so that the effect of eliminating static electricity is improved.

During the operation of the blower 100, the fan 10 is rotated to generate air flow; however, a vibration is also generated at the same time. The vibration can be transferred to the inner air duct 421 through the motor 20. If the inner air duct 421 is connected directly with the main housing 41, the main housing 41 will vibrate. The user will feel uncomfortable when he grips the gripping portion 104 formed by the main housing 41.

Figure 8:
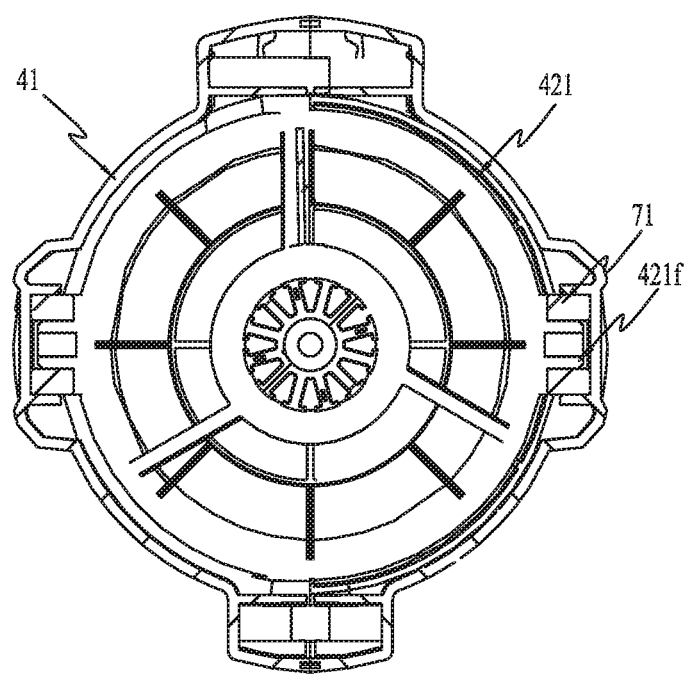
FIG. 8 is a schematic view of a section of the blower in FIG. 1.

Referring to FIGS. 3 and 8, a plurality of damping elements 71, 72, 73, 74 are arranged between the outside of the inner air duct 421 and the inside of the main housing 41, which are made of a flexible material or an elastic material. When the vibration passes through the damping elements 71, 72, 73, 74, the vibration between the inner air duct 421 and the main housing 41 is decreased due to the material characteristics.

The damping elements 71, 72, 73, 74 equally make the inner air duct 421 and the main housing 41 depart from each other at some positions so as not to contact directly with each other, so the vibration transmission at the damping elements 71, 72, 73, 74 is blocked.

The damping elements 71, 72, 73, 74 can be arranged symmetrically. For example, taking the middle plane 104a as a symmetry plane, the damping elements 71, 72, 73, 74 can be distributed on the two sides of the inner air duct 421, and each side has two damping elements.

The damping element 71 may have an annular shape. The inner air duct 421 includes a locating pin 421f on its outside for locating the damping element 71. The damping element 71 can be engaged with the locating pin 421f. Correspondingly, the main housing 41 includes a locating recess on its inside for receiving the damping element 71. The locating recess is not shown, and another symmetrical locating recess 415 can be referred. In order to locate other damping elements 72, 73, 74, the similar locating structure can be used.

It is contemplated that the positions of the locating pin and the locating recess can be exchanged.

Figure 10:
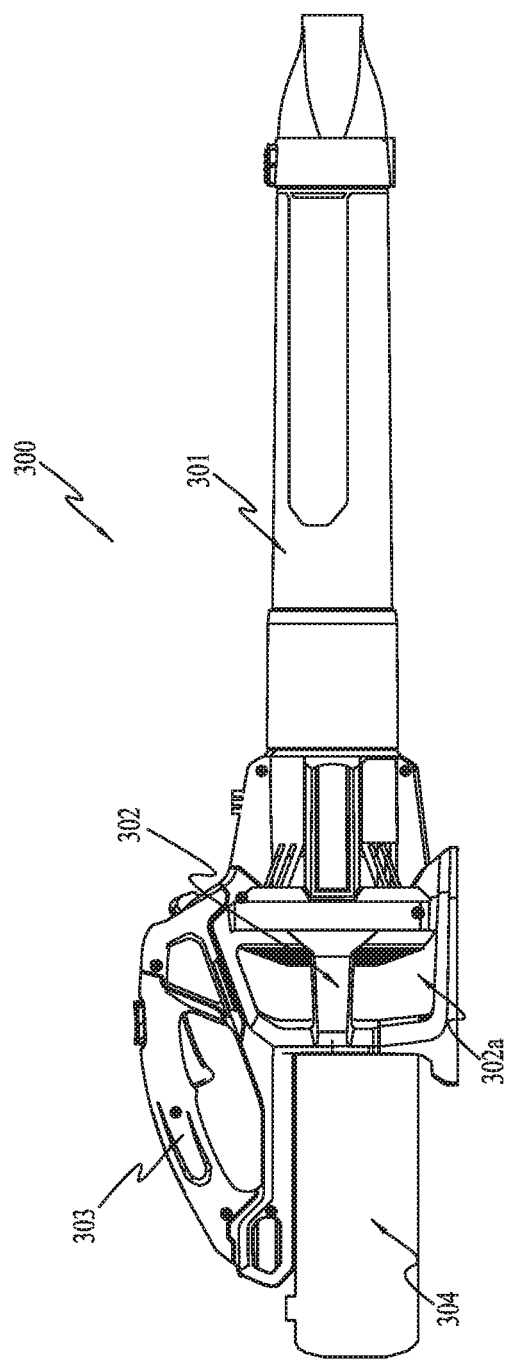
FIG. 10 is a further schematic view of an exemplary blower.

As shown in FIG. 10, a further blower 300 includes an air duct portion 301, a connection portion 302, and a gripping portion 303 which are similar to those of the blower 100 in FIG. 1. The difference is that the blower 300 uses an engine (not shown) as a prime mover and a fuel tank 304 as a power source for supplying power to the engine. The connection portion 302 is disposed between the fuel tank 304 and the air duct portion 301. The connection portion 302 is provided with an air intake space 302a which may have the same structure as the air intake space 103a in FIG. 1.

Figure 11:
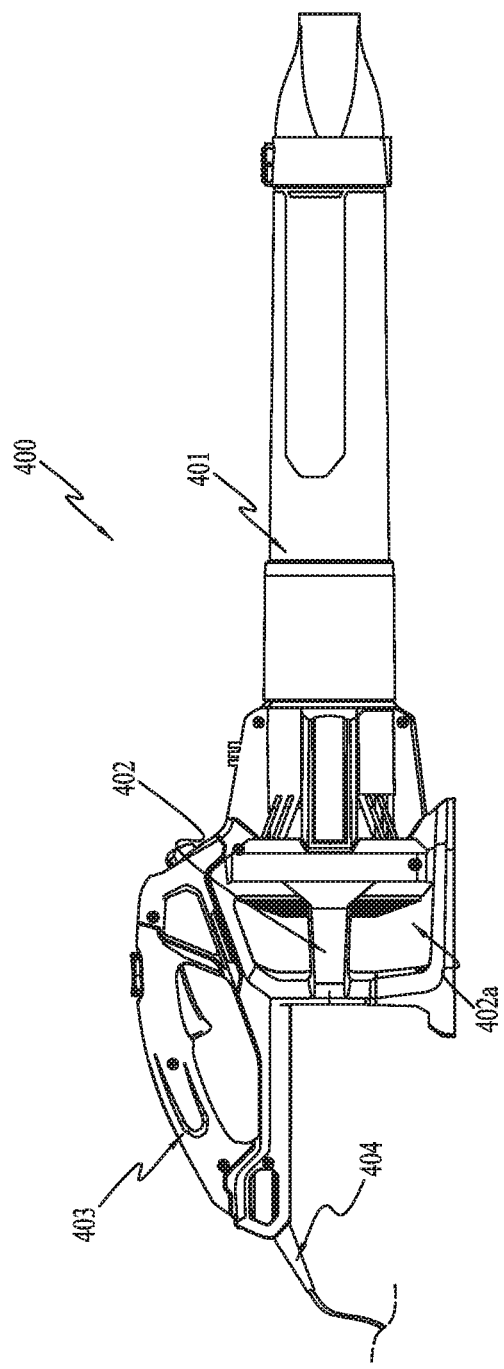
FIG. 11 is a still further schematic view of an exemplary blower.

As shown in FIG. 11, a still further blower 400 includes an air duct portion 401, a connection portion 402, and a gripping portion 403 which are similar to those of the blower 100 in FIG. 1. The difference is that the blower 400 uses an AC motor (not shown) as a prime mover and a supply unit 404 connected with an AC power as a power source for supplying power to the AC motor. The connection portion 402 is disposed between the supply unit 404 and the air duct portion 401. The connection portion 402 is provided with an air intake space 402a which may have the same structure as the air intake space 103a in FIG. 1.

The above illustrates and describes basic principles, main features and advantages of the claimed invention. Those skilled in the art should appreciate that the above embodiments are not intended to limit the claimed invention in any form. Technical solutions obtained by equivalent substitution or equivalent variations all fall within the scope of the claimed invention.

What is claimed is:

1. A blower, comprising:
   a fan for generating an air flow;
   a motor for driving the fan to rotate about a central axis;
   a battery pack for supplying power to the motor;
   an air duct portion comprising an air duct extending along the central axis;
   a coupling portion for coupling with the battery pack;
   a connection portion for connecting the air duct portion with the coupling portion, the connecting portion comprising a cantilever, a base, a first arm on a first side between the cantilever and the base, and a second arm on a second side between the cantilever and the base, wherein the cantilever, base, first arm, and second arm are circumferentially spaced around the central axis,
   wherein the fan is received in the air duct, the air duct comprises an air duct inlet and an air duct outlet which are respectively located at opposite ends of the air duct, the air duct inlet is located between the air duct outlet and the coupling portion, the connection portion defines an air intake space located between the air duct inlet and the coupling portion, and the air intake space is opened along a radial direction of the central axis with no physical structure between the cantilever and the first and second arms, or the base and the first and second arms; and
   a cover covering the air duct inlet and having a plurality of holes located between the air intake space and the air duct inlet.

2. The blower of claim 1, further comprising a gripping portion for a user to grip, the gripping portion residing on a middle plane and being symmetrical relative to the middle plane wherein the air intake space is opened in a direction substantially perpendicular to the middle plane.

3. The blower of claim 1, further comprising a gripping portion for a user to grip, when the battery pack is coupled to the coupling portion, the gripping portion and the battery pack are respectively located on opposite sides of the coupling portion, and the air intake space is opened on the opposite sides.

4. The blower of claim 1, further comprising a gripping portion for a user to grip, the gripping portion is connected with the coupling portion, a length direction of the gripping portion and the central axis intersect to form a plane, and the air intake space is opened in a direction substantially perpendicular to the plane.

5. The blower of claim 1, further comprising a main housing at least forming the connection portion and a circuit board for controlling the motor, wherein the main housing comprises:
   a containing chamber for containing the circuit board; and
   a cooling air outlet allowing the air passing through the circuit board to flow from an inside of the containing chamber to the air intake space when the fan is rotated.

6. The blower of claim 5, wherein the cooling air outlet is disposed on the connection portion.

7. The blower of claim 5, wherein the cooling air outlet is arranged so as to correspond with the air intake space in a direction substantially parallel to the central axis.

8. The blower of claim 5, wherein the main housing comprises a cooling air inlet allowing the air outside the containing chamber to flow into the containing chamber, the cooling air inlet is disposed on the connection portion.

9. The blower of claim 8, wherein the main housing comprises at least two cooling air inlets which are disposed on opposite sides of the connection portion.

10. A blower, comprising: a fan for generating an air flow; a motor for driving the fan to rotate about a central axis; an air duct portion comprising an air duct, the air duct extending along the central axis; a coupling portion for coupling with a battery pack, the battery pack being capable of supplying power to the motor; a connection portion connected with the air duct portion and the coupling portion, the connection portion including a cantilever and a base; and a gripping portion for a user to grip, wherein the fan is received in the air duct, the air duct comprises an air duct inlet and an air duct outlet which are respectively located at two ends of the air duct, the air duct inlet is located between the air duct outlet and the coupling portion, the connection portion is provided with an air intake space disposed between the air duct portion and the coupling portion, the air intake portion space opened along a radial direction of the central axis with no side cover between the cantilever and the base; and a cover covering the air duct inlet and having a plurality of holes is located between the air intake space and the air duct inlet.

11. The blower of claim 10, wherein the air intake space is opened in a radial direction of the central axis and the radial direction is intersected obliquely with the middle plane.

12. The blower of claim 10, further comprising a main housing at least forming the gripping portion, wherein the air duct portion comprises an air duct housing forming the air duct and a damping element for reducing vibration transmissions is disposed between the main housing and the air duct housing.

13. The blower of claim 12, further comprising a plurality of damping elements which are distributed symmetrically on opposed sides of the middle plane.

14. The blower of claim 10, further comprising:
a consuming device for transforming electric energy to optical energy or thermal energy; and
a conducting element for connecting the air duct portion and the consuming device wherein the conducting element is made of a conducting material.

15. The blower of claim 14, wherein the consuming device comprises a resistor or a neon tube.

16. The blower of claim 10, further comprising:
a contacting element capable of transferring static electricity to a human body when the contacting element is contacted with a human body; and
a conducting element for connecting the contacting element and the air duct portion wherein the conducting element is made of a conducting material;
wherein the contacting element is disposed on the gripping portion and the contacting element has a resistivity which is less than or equal to $10^{10}$ Ω·m.

17. The blower of claim 10, further comprising:
a consuming device for transforming electric energy to optical energy or thermal energy; and
a conducting element for connecting the motor and the consuming device, the conducting element being made of a conducting material.

18. The blower of claim 10, further comprising:
a contacting element capable of transferring static electricity to the human body when the contacting element is contacted with a human body; and
a conducting element for connecting the contacting element and the motor, the conducting element being made of a conducting material;
wherein the contacting element is disposed on the gripping portion and the contacting element has a resistivity which is less than or equal to $10^{10}$ Ω·m.

19. A blower, comprising:
a fan for generating an air flow;
a prime mover for driving the fan to rotate about a central axis;
a power source for supplying power to the prime mover;
an air duct portion forming an air duct, the air duct extending along the central axis; and
a connection portion for connecting the air duct portion with the power source,
wherein the fan is received in the air duct, the air duct comprises an air duct inlet and an air duct outlet which are respectively located at the two ends of the air duct, the air duct inlet is located between the air duct outlet and the power source, the connection portion is provided with an air intake space located between the air duct inlet and the power source, and the air intake space is opened in a radial direction of the central axis, and
a cover located between the air intake space and the air duct inlet, the cover covering the air duct inlet and having a plurality of holes.

20. The blower of claim 19, further comprising:
a coupling portion;
wherein the prime mover is a motor; the power source is a battery pack; the connection portion is for connecting the air duct portion with the coupling portion; and the couple portion is for coupling the battery pack to the connection portion.

21. The blower of claim 20, further comprising a gripping portion for a user to grip, the gripping portion residing on a middle plane and being symmetrical relative to the middle plane wherein the air intake space is opened in a direction substantially perpendicular to the middle plane.

22. The blower of claim 20, further comprising a gripping portion for a user to grip, when the battery pack is coupled to the coupling portion, the gripping portion and the battery pack are respectively located on opposite sides of the coupling portion, and the air intake space is opened on the opposite sides.

23. The blower of claim 20, further comprising a gripping portion for a user to grip, the gripping portion is connected with the coupling portion, a length direction of the gripping portion and the central axis intersect to form a plane, and the air intake space is opened in a direction substantially perpendicular to the plane.

24. The blower of claim 20, further comprising a gripping portion for a user to grip, wherein the connection portion comprises:
a cantilever wherein the cantilever and the gripping portion are located on the same side of the central axis; and
a base wherein the base and the gripping portion are respectively located on the two sides of the central axis;
wherein the air intake space is opened between the cantilever and the base.

25. The blower of claim 20, further comprising a main housing at least forming the connection portion and a circuit board for controlling the motor, wherein the main housing comprises:
a containing chamber for containing the circuit board; and
a cooling air outlet allowing the air passing through the circuit board to flow from an inside of the containing chamber to the air intake space when the axial fan is rotated.

26. The blower of claim 25, wherein the cooling air outlet is disposed on the connection portion.

27. The blower of claim 26, wherein the cooling air outlet is arranged so as to correspond with the air intake space in a direction substantially parallel to the central axis.

28. The blower of claim 26, wherein the main housing comprises at least two cooling air inlets which are disposed on the opposite sides of the connection portion allowing the air outside the containing chamber to flow into the containing chamber.

\* \* \* \* \*